United States Patent
Matsumoto

(10) Patent No.: US 10,360,676 B2
(45) Date of Patent: Jul. 23, 2019

(54) CELL IMAGE EVALUATION DEVICE, METHOD, AND PROGRAM

(71) Applicant: FUJIFILM Corporation, Tokyo (JP)

(72) Inventor: Tsuyoshi Matsumoto, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/220,015

(22) Filed: Jul. 26, 2016

(65) Prior Publication Data

US 2016/0335767 A1 Nov. 17, 2016

Related U.S. Application Data

(63) Continuation of application No. PCT/JP2015/051394, filed on Jan. 20, 2015.

(30) Foreign Application Priority Data

Mar. 5, 2014 (JP) .................. 2014-043254

(51) Int. Cl.
*G06K 9/00* (2006.01)
*G06T 7/00* (2017.01)
*G06T 7/62* (2017.01)

(52) U.S. Cl.
CPC .......... *G06T 7/0012* (2013.01); *G06K 9/0014* (2013.01); *G06K 9/00134* (2013.01);
(Continued)

(58) Field of Classification Search
None
See application file for complete search history.

(56) References Cited

U.S. PATENT DOCUMENTS

2006/0139638 A1* 6/2006 Muller .................. G01N 15/12
356/342
2010/0172555 A1 7/2010 Hasezawa et al.
(Continued)

FOREIGN PATENT DOCUMENTS

JP 2006-333710 A 12/2006
JP 2006333710 A * 12/2006
(Continued)

OTHER PUBLICATIONS

Japanese Notification of Reasons for Refusal for Japanese Application No. 2014-043254, dated Oct. 4, 2016, with Machine Translation.
(Continued)

*Primary Examiner* — Samah A Beg
(74) *Attorney, Agent, or Firm* — Birch, Stewart, Kolasch & Birch, LLP

(57) ABSTRACT

There is provided a cell image evaluation device, method, and program to appropriately evaluate the state of a stem cell colony according to different changes in form of respective local regions of the cell colony. There are included a low magnification image acquisition unit 20 that acquires a cell image by imaging cells; a cell evaluation unit 23 that evaluates the cell image; and a local region information acquisition unit 21 that acquires the specific information of a local region in a colony region of the cells in the cell image. The cell evaluation unit 23 determines, for each local region in the colony region, an evaluation method for a cell image in the local region based on the specific information of the local region, and evaluates the cell image of the local region using the determined evaluation method.

18 Claims, 5 Drawing Sheets

(52) U.S. Cl.
CPC ............ *G06K 9/00147* (2013.01); *G06T 7/62* (2017.01); *G06T 2207/10056* (2013.01); *G06T 2207/30024* (2013.01)

(56) References Cited

U.S. PATENT DOCUMENTS

| | | | | |
|---|---|---|---|---|
| 2011/0019897 | A1* | 1/2011 | Takagi | G06T 7/0012 382/133 |
| 2011/0019898 | A1* | 1/2011 | Takagi | G06T 7/0012 382/133 |
| 2012/0122143 | A1* | 5/2012 | Mimura | C12M 41/14 435/29 |
| 2012/0134571 | A1* | 5/2012 | Ito | G06T 1/00 382/133 |
| 2013/0109051 | A1* | 5/2013 | Li | C12M 41/46 435/34 |
| 2014/0073002 | A1* | 3/2014 | Yamauchi | G01N 15/1456 435/34 |
| 2014/0227682 | A1* | 8/2014 | Seth | C12Q 1/70 435/5 |
| 2015/0187077 | A1* | 7/2015 | Ozaki | G06T 7/0012 382/133 |
| 2016/0160170 | A1* | 6/2016 | Matsubara | C12M 41/36 435/287.1 |
| 2016/0163049 | A1* | 6/2016 | Matsubara | C12M 41/36 382/133 |
| 2016/0364599 | A1* | 12/2016 | Tsujimoto | G02B 21/14 |
| 2016/0370569 | A1* | 12/2016 | Matsumoto | G02B 21/0004 |
| 2017/0061618 | A1* | 3/2017 | Matsubara | C12Q 1/02 |
| 2017/0081628 | A1* | 3/2017 | Matsubara | C12M 1/34 |
| 2017/0166948 | A1* | 6/2017 | Matsumoto | C12Q 1/02 |
| 2017/0191021 | A1* | 7/2017 | Wakui | C12M 41/46 |

FOREIGN PATENT DOCUMENTS

| | | |
|---|---|---|
| JP | 2011-43988 A | 3/2011 |
| JP | 2011-229409 A | 11/2011 |
| JP | 2011-239778 A | 12/2011 |
| JP | 5355275 B2 | 11/2013 |
| JP | 2014-18186 A | 2/2014 |
| WO | WO 2004/042392 A1 | 5/2004 |
| WO | WO 2008/129881 A1 | 10/2008 |
| WO | WO 2011/013319 A1 | 2/2011 |
| WO | WO 2012/115153 A1 | 8/2012 |

OTHER PUBLICATIONS

International Search Report for PCT/JP2015/051394 dated Mar. 24, 2015.
Written Opinion of the International Searching Authority for PCT/JP2015/051394 dated Mar. 24, 2015.
English Translation of International Preliminary Report on Patentability for PCT/JP2015/051394 (including PCT/IB/373 and PCT/ISA/237), dated Sep. 6, 2016.

* cited by examiner

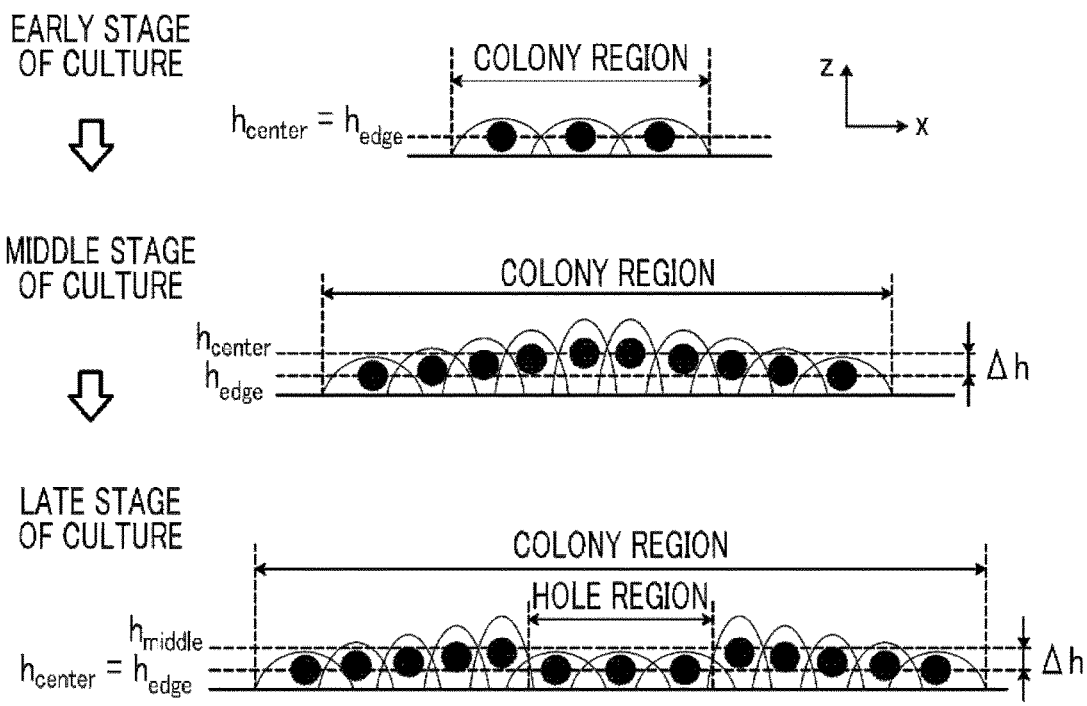

CELL IMAGE EVALUATION DEVICE, METHOD, AND PROGRAM

CROSS-REFERENCE TO RELATED APPLICATIONS

This application is a Continuation of PCT International Application No. PCT/JP2015/051394 filed on Jan. 20, 2015, which claims priority under 35 U.S.C § 119(a) to Patent Application No. 2014-043254 filed in Japan on Mar. 5, 2014, all of which are hereby expressly incorporated by reference into the present application.

BACKGROUND OF THE INVENTION

1. Field of the Invention

The present invention relates to a cell image evaluation device, method, and non-transitory computer readable recording medium storing a program for evaluating cell image obtained by imaging cells.

2. Description of the Related Art

Conventionally, a method of imaging pluripotent stem cells such as ES cells, iPS cells, and STAP cells, differentiation-induced cells, or the like using a microscope or the like and determining the culture state of cells by ascertaining the features of the image has been proposed.

For example, JP2011-239778A and JP2011-229409A have proposed a method of acquiring the morphological feature quantity of cells from a cell image, which is obtained by imaging the cells, and evaluating the proportion of cancer cells in the cell image based on the feature quantity.

JP2006-333710A has proposed setting a cell image analysis program in advance for each type of cell and analyzing the cell image corresponding to the type of cell using the analysis program.

In addition, JP5355275B has proposed a method of specifying a cell colony region automatically from a cell image.

SUMMARY OF THE INVENTION

Here, for example, in the case of culturing stem cells, the form of a stem cell colony changes according to the culture period. Specifically, for example, in the early stage of culture, undifferentiated cells are uniformly distributed in a colony region. However, as the culture progresses, differentiation starts in a peripheral portion of the colony region so that differentiated cells are distributed in the peripheral portion.

In the case of evaluating the state of a stem cell colony according to such locally different changes in the stem cell colony, for example, using the same evaluation method for the entire stem cell colony, the state of the stem cell colony may not be able to be appropriately evaluated. For example, in a stem cell colony, lamination may occur in the central portion when the culture progresses to some extent. In such a case, if the entire stem cell colony is evaluated using the form of individual cells, it is not possible to appropriately evaluate the stem cell colony since it is very difficult to recognize individual cells in the central portion due to lamination.

In JP2011-239778A, JP2011-229409A, JP2006-333710A, and JP5355275B, there are no proposals for taking into consideration the above-described different changes in form of respective local regions of a stem cell colony.

In view of the aforementioned problems, it is an object of the present invention to provide a cell image evaluation device, method, and non-transitory computer readable recording medium storing a program capable of appropriately evaluating the state of a stem cell colony according to different changes in form of respective local regions of the cell colony.

A cell image evaluation device of the present invention comprises: an image acquisition unit that acquires a cell image by imaging cells; a cell evaluation unit that evaluates the cell image; and a local region information acquisition unit that acquires specific information of a local region in a colony region of the cells in the cell image. The cell evaluation unit determines, for each local region in the colony region, an evaluation method for a cell image in the local region based on the specific information of the local region, and evaluates the cell image of the local region using the determined evaluation method.

In the cell image evaluation device of the present invention described above, the cell evaluation unit can determine an evaluation method based on a brightness distribution of the cell image of the local region in a case where the local region is a central portion of the colony region.

In the cell image evaluation device of the present invention described above, the cell evaluation unit can determine an evaluation method based on a state of individual cells included in the cell image of the local region in a case where the local region is a peripheral portion of the colony region.

In the cell image evaluation device of the present invention described above, the cell evaluation unit can determine an evaluation method based on an image of a halo included in the cell image of the local region in a case where the local region is a peripheral portion of the colony region.

In the cell image evaluation device of the present invention described above, the cell evaluation unit can determine an evaluation method based on contrast of an edge of the colony region included in the cell image of the local region in a case where the local region is a peripheral portion of the colony region.

A maturity information acquisition unit that acquires information regarding maturity of the cells can be further provided, and the cell evaluation unit can determine an evaluation method for each local region based on the specific information of the local region and the information regarding the maturity.

As the information regarding the maturity, it is possible to use information of a culture period of the cells.

The maturity information acquisition unit can acquire the information regarding the maturity by analyzing image information of the colony region.

As the information regarding the maturity, it is possible to use information regarding a shape or a size of the colony region.

The cell evaluation unit can determine an evaluation method for each local region based on the specific information of the local region, the information regarding the maturity, and culture conditions of the cells.

A pre-evaluation unit that performs pre-evaluation of the cell image before evaluating the cell image of the local region can be further provided, and the cell evaluation unit can determine an evaluation method for the cell image in the local region based on a result of the pre-evaluation.

The local region information acquisition unit can acquire the specific information of the local region based on a cell image of the colony region.

The cell evaluation unit can determine an evaluation method for each local region based on the specific information of the local region and a type of the cells.

The cell evaluation unit can specify the type of the cells based on a cell image of the colony region.

A cell image evaluation method of the present invention includes: acquiring a cell image by imaging cells; acquiring specific information of a local region in a colony region of the cells in the cell image; and determining, for each local region in the colony region, an evaluation method for a cell image in the local region based on the acquired specific information of the local region and evaluating the cell image of the local region using the determined evaluation method.

A non-transitory computer readable recording medium storing a cell image evaluation program of the present invention causes a computer to function as: an image acquisition unit that acquires a cell image by imaging cells; a cell evaluation unit that evaluates the cell image; and a local region information acquisition unit that acquires specific information of a local region in a colony region of the cells in the cell image. The cell evaluation unit determines, for each local region in the colony region, an evaluation method for a cell image in the local region based on the specific information of the local region, and evaluates the cell image of the local region using the determined evaluation method.

According to the cell image evaluation device, method, and non-transitory computer readable recording medium storing a program of the present invention, the specific information of a local region in the cell colony region in the cell image is acquired, an evaluation method for the cell image in the local region is determined based on the specific information of the local region for each local region, and the cell image of the local region is evaluated using the determined evaluation method. Therefore, it is possible to appropriately evaluate the state of the cell colony according to different changes in form of the respective local regions of the cell colony.

BRIEF DESCRIPTION OF THE DRAWINGS

FIG. 3 is a diagram showing an example of the form of a stem cell colony in the early stage of culture, the middle stage of culture, and the late stage of culture.

FIG. 4 is a diagram showing an example of a table in which culture conditions, a culture period, a position in a colony region, and a cell image evaluation method are associated with each other.

DESCRIPTION OF THE PREFERRED EMBODIMENTS

Figure 1:
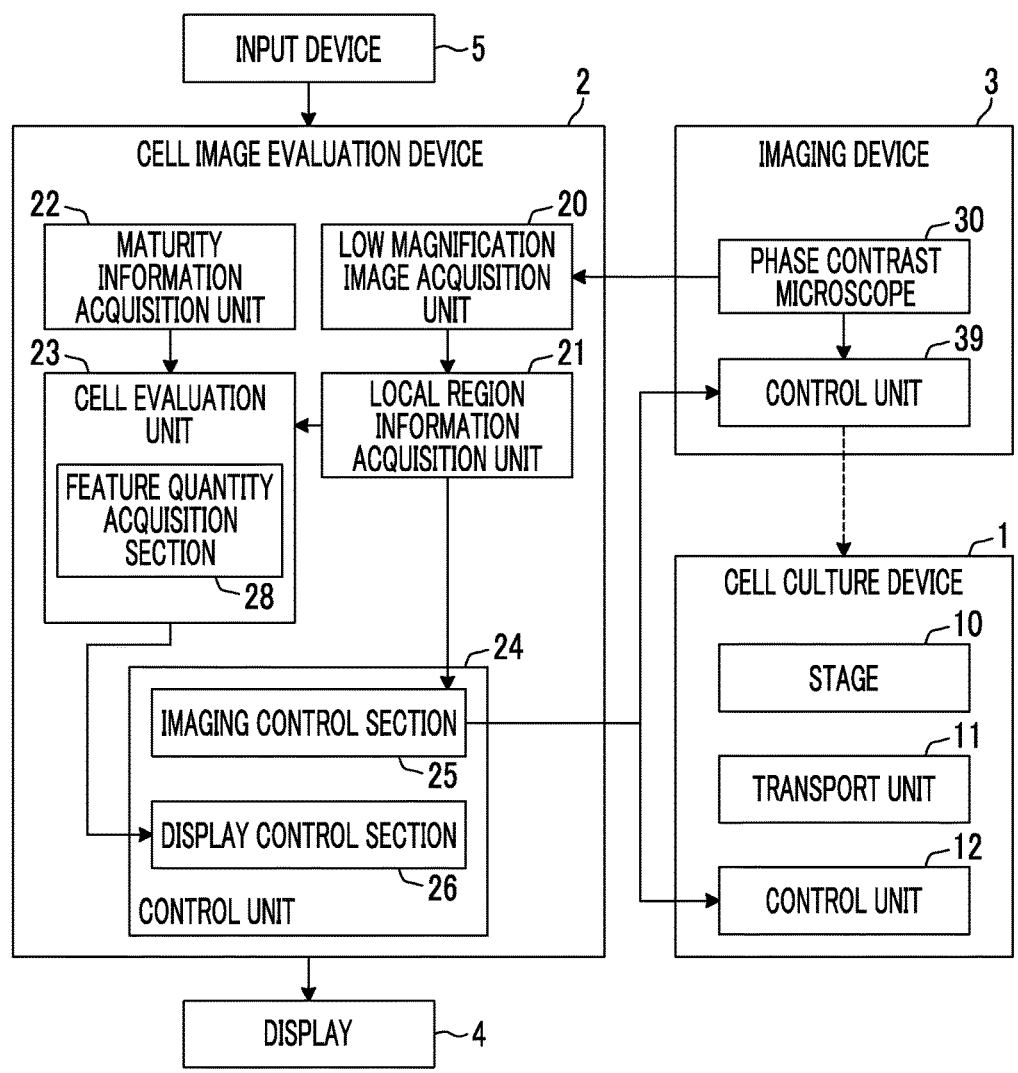
FIG. 1 is a block diagram showing the schematic configuration of a stem cell culture observation system using an embodiment of a cell image evaluation device of the present invention.

Hereinafter, an embodiment of a cell image evaluation device, method, and non-transitory computer readable recording medium storing a program of the present invention will be described in detail with reference to the diagrams. First, the overall configuration of a cell culture observation system including an embodiment of the cell image evaluation device of the present invention will be described. FIG. 1 is a block diagram showing the schematic configuration of a cell culture observation system.

As shown in FIG. 1, the cell culture observation system of the present embodiment includes a cell culture device 1, a cell image evaluation device 2, an imaging device 3, a display 4, and an input device 5.

The cell culture device 1 is a device for culturing cells. As cells to be cultured, for example, there are pluripotent stem cells such as iPS cells, ES cells, or STAP cells, cells of nerves, skin, myocardium, or liver that are differentiation-induced from stem cells, and cancer cells. In the cell culture device 1, a plurality of culture vessels are housed in which stem cells to be cultured are seeded on a culture medium. The cell culture device 1 includes a stage 10, a transport unit 11, and a control unit 12.

On the stage 10, a culture vessel to be imaged by the imaging device 3 is placed. The transport unit 11 selects a culture vessel to be imaged from a plurality of culture vessels housed in a predetermined position in the cell culture device 1, and transports the selected culture vessel to the stage 10. The control unit 12 controls the entire cell culture device 1, and controls not only the operation of the stage 10 or the transport unit 11 but also environmental conditions, such as the temperature, humidity, and $CO_2$ concentration in the cell culture device 1. As the configuration for adjusting the temperature, humidity, and $CO_2$ concentration, it is possible to use a known configuration.

The imaging device 3 captures a cell image of cells in the culture vessel placed on the stage 10. The imaging device 3 includes a phase contrast microscope 30 that images cells and outputs a cell image and a control unit 39 that controls the phase contrast microscope 30.

Figure 2:
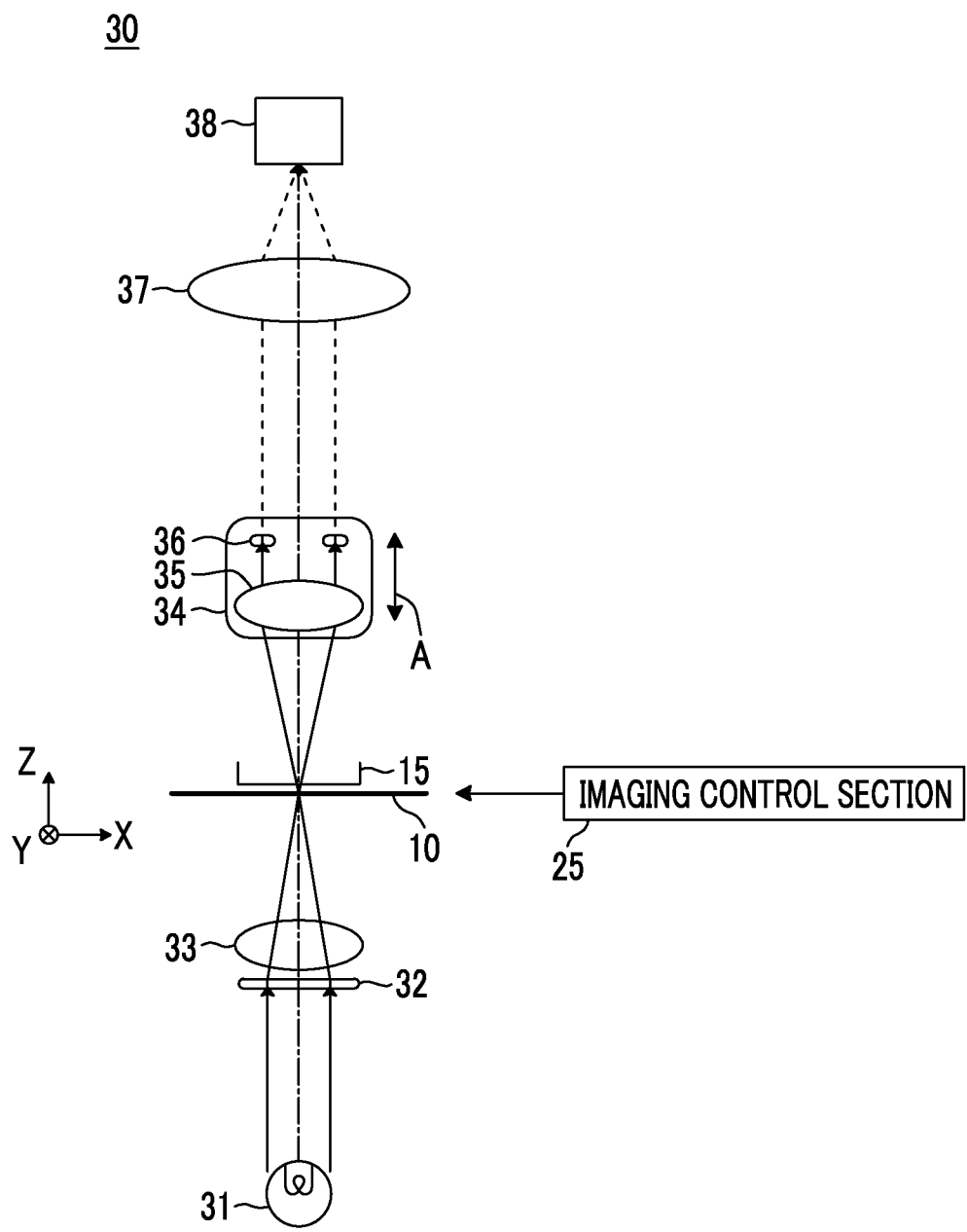
FIG. 2 is a diagram showing the schematic configuration of a phase contrast microscope.

The phase contrast microscope 30 captures a phase image of cells within the culture vessel placed on the stage 10. FIG. 2 is a diagram showing the schematic configuration of the phase contrast microscope 30. As shown in FIG. 2, the phase contrast microscope 30 includes: a white light source 31 which emits white light; a slit plate 32 which has a ring-shaped slit, on which the white light emitted from the white light source 31 is incident, and which emits ring-shaped illumination light; and an objective lens 33 on which the ring-shaped illumination light emitted from the slit plate 32 is incident and which emits the incident ring-shaped illumination light to cells in a culture vessel 15 placed on the stage 10.

In addition, a phase difference lens 34, an imaging lens 37, and an imaging element 38 are provided on the opposite side to the white light source 31 with respect to the stage 10.

The phase difference lens 34 includes an objective lens 35 and a phase plate 36. The phase plate 36 is configured by forming a phase ring on a transparent plate that is transparent for the wavelength of the ring-shaped illumination light. In addition, the size of the slit of the slit plate 32 described above and the phase ring are in the conjugate relationship.

The phase ring is configured by forming a phase film, which shifts the phase of incident light by ¼ wavelength, and a dimming filter for dimming the incident light. Direct light incident on the phase difference lens 34 is condensed by the objective lens 35, and is transmitted through the phase ring. As a result, the phase of the direct light is shifted by ¼ wavelength, and the brightness is weakened. On the other hand, most of the diffracted light diffracted by the cells in the culture vessel 15 passes through the transparent plate of the phase plate, and the phase and the brightness are not changed.

The phase difference lens 34 is moved in the arrow A direction shown in FIG. 2 by a driving mechanism (not shown). A focus position is changed by such movement of the phase difference lens 34, so that the focus control is performed. The driving mechanism moves the phase difference lens 34 based on the focus control signal output from an imaging control section 25 of the cell image evaluation device 2.

In addition, the phase contrast microscope 30 of the present embodiment is configured such that a plurality of phase difference lenses 34 having different magnifications are replaceable. For the replacement of the phase difference lens 34, automatic replacement may be performed according to an instruction input from the user, or manual replacement may be performed by the user.

In the present embodiment, low magnification imaging for macro observation and high magnification imaging for detailed observation are performed. The 1× to 4× phase difference lens 34 is used at the time of low magnification imaging, and 10× to 20× phase difference lens 34 is used at the time of high magnification imaging. However, the low magnification imaging and the high magnification imaging may be performed with relatively different magnifications, and are not limited to such magnification.

Direct light and diffracted light that are transmitted through the phase difference lens 34 are incident on the imaging lens 37, and an image of these light beams is formed on the imaging element 38. The imaging element 38 captures a phase image of cells by performing photoelectric conversion of the image formed by the imaging lens 37. As the imaging element 38, a charge-coupled device (CCD) image sensor, a complementary metal-oxide semiconductor (CMOS) image sensor, or the like can be used.

Although the phase contrast microscope 30 is used as an imaging device in the present embodiment, microscopes capable of changing to other optical magnification may be used. For example, a differential interference microscope may be used.

Referring back to FIG. 1, the cell image evaluation device 2 includes a low magnification image acquisition unit 20 (corresponding to an image acquisition unit), a local region information acquisition unit 21, a maturity information acquisition unit 22, a cell evaluation unit 23, and a control unit 24. The cell evaluation unit 23 includes a feature quantity acquisition section 28, and the control unit 24 includes an imaging control section 25 and a display control section 26.

The cell image evaluation device 2 is formed by installing an embodiment of a cell image evaluation program of the present invention in a computer.

The cell image evaluation device 2 includes a central processing unit, a semiconductor memory, a hard disk, and the like, and an embodiment of the cell image evaluation program of the present invention is installed in the hard disk. When the program is executed by the central processing unit, the low magnification image acquisition unit 20, the local region information acquisition unit 21, the maturity information acquisition unit 22, the cell evaluation unit 23, the feature quantity acquisition section 28, the imaging control section 25, and the display control section 26 shown in FIG. 1 operate.

The low magnification image acquisition unit 20 acquires a cell image obtained by performing the above-described low magnification imaging by the phase contrast microscope 30. As the low magnification image acquired by the low magnification image acquisition unit 20, one image may be acquired by imaging one cell colony, or a group of a plurality of images may be acquired by dividing one cell colony into a plurality of rectangular divided regions. In addition, a plurality of cell colonies may be included in one image.

The low magnification image acquisition unit 20 stores identification information for identifying a cell colony and a low magnification image so as to match each other. For example, in a case where one cell colony is captured in one low magnification image, identification information of the cell colony and the low magnification image are stored so as to match each other in a one-to-one manner. In a case where one cell colony is captured in low magnification images of a plurality of divided regions, identification information of the cell colony and the low magnification images of the plurality of divided regions are stored so as to match each other. In addition, in a case where a plurality of cell colonies are captured in one low magnification image, identification information of each of the cell colonies and one low magnification image are stored so as to match each other.

By managing the identification information of each cell colony and a low magnification image so as to match each other as described above, for example, when a user inputs the identification information of the cell colony through the input device 5, it is possible to immediately read and display the low magnification image matched with the identification information.

The local region information acquisition unit 21 specifies a cell colony region in the low magnification image acquired by the low magnification image acquisition unit 20, and acquires information specifying a local region in the cell colony region (specific information of a local region). As a method of specifying a cell colony region, for example, it is desirable to specify a position by converting a low magnification image into a binary image and then automatically extracting a cell colony region by template matching or the like. For the automatic extraction of a cell colony region, other known methods may be used without being limited to the method described above.

In addition, without being limited to the automatic extraction, a low magnification image may be displayed on the display 4 by the display control section 26, the user may designate a cell colony region in the low magnification image using the input device 5, and the local region information acquisition unit 21 may acquire position information, such as the designated coordinates.

As a local region, for example, there is a central portion or a peripheral portion in a cell colony region. However, the local region is not limited thereto. A user may set and input the information specifying a local region using the input device 5, or the information specifying a local region may be specified based on a low magnification image in the cell colony region. Specifically, for example, in a case where a plurality of types of cells are included in a cell colony region, a region where specific types of cells are distributed may be extracted based on a low magnification image in a cell colony, and the extracted region may be specified as a local region. For the extraction of specific types of cell regions, known methods can be used. Alternatively, a local region may be specified according to the density of cells or the like.

In addition, for example, relative position information for the cell colony, such as a central portion or a peripheral portion, in the cell colony, may be stored in advance in a memory or the like as the information specifying a local region, and the position information may be acquired by the local region information acquisition unit 21.

The maturity information acquisition unit 22 acquires information regarding the maturity of cells. The information regarding the maturity acquired by the maturity information acquisition unit 22 is used when determining a method of evaluating the cell image of a cell colony region in the cell evaluation unit 23.

In the present embodiment, the maturity of cells is divided into three stages of an early stage of culture, a middle stage of culture, a late stage of culture, and information regarding the maturity of cells is acquired by the maturity information acquisition unit 22, thereby acquiring a stage to which the maturity of cells to be imaged belongs.

The reason why the maturity of cells is divided into the early stage of culture, the middle stage of culture, the late stage of culture is that the form of a cell colony differs depending on each of the stages and it is desirable to determine the cell image evaluation method according to the form.

Specifically, for example, in the case of a stem cell colony, in the early stage of culture, undifferentiated cells are uniformly distributed in a colony region example as shown in FIG. 3. Then, in the middle stage of culture, as shown in FIG. 3, undifferentiated cells are densely distributed in the central portion of the colony region, and differentiation starts and differentiated cells are distributed in the peripheral portion of the colony region. In addition, undifferentiated cells concentrate to be laminated in the central portion of the colony region, but the peripheral portion is maintained as a single layer.

Then, in the late stage of culture, as shown in FIG. 3, a phenomenon called a hole occurs in which differentiation occurs easily in the central portion of the colony region. Accordingly, differentiated cells are distributed in the central portion and the peripheral portion of the colony region, and differentiated cells are distributed in an intermediate portion between the central portion and the peripheral portion.

As described above, the form of the cell colony region changes in the early stage of culture, the middle stage of culture, and the late stage of culture, and the form change is different for each local region in the cell colony region. In the present embodiment, therefore, the cell image evaluation method is determined for each culture period and each local region in the cell colony region. The evaluation method for each local region will be described in detail later.

The information regarding the maturity of cells that is acquired by the maturity information acquisition unit 22 may be any information indicating the stage of maturity of cells. For example, a culture period measured by a timer or the like can be acquired as the information regarding the maturity. Without being limited to the culture period, for example, image information of the cell colony region in a low magnification cell image may be analyzed, the size of the cell colony, the number of cells in the cell colony, or the number of cells per unit area smaller than the cell colony may be measured, and such information may be acquired as the information regarding the maturity. For example, it is determined that the maturity increases as the measured number of cells increases. As the size of the cell colony, it is possible to acquire the area, perimeter, maximum diameter, and the like of the cell colony.

In addition, for example, the brightness of the image of a cell colony region or a texture, such as uniformity or asperity, may be acquired as the information regarding the maturity. For example, in a case where cells to be imaged are stem cells, as the maturity increases, the density of stem cells increases, stem cells are further laminated, and the brightness of an image is gradually increased. Accordingly, it can be said that the maturity increases as the brightness increases.

In addition, in a case where the maturity increases and stem cells proliferate to be laminated as described above, the uniformity of the image becomes high, and a smooth image with a small amount of irregularities is obtained. Accordingly, it can be said that the maturity increases as the uniformity of an image becomes high and as the image becomes smooth. As a method of acquiring the feature quantity amount of the uniformity or smoothness of the image, it is possible to use a known method.

In addition, as the information regarding the maturity, the feature quantity of the shape of each stem cell colony may be acquired. As the maturity of the stem cell increases, the shape of the stem cell colony gradually approaches a circle. Then, differentiation in a peripheral portion progresses, and the complexity of the edge is increased. Therefore, such a feature quantity of change in the shape of the stem cell colony can be acquired as the feature quantity related to the maturity.

In addition, as the information regarding the maturity, the feature quantity of the thickness of each stem cell colony may be acquired. As the maturity of the stem cell increases, the stem cell colony becomes thick gradually. Therefore, such a feature quantity of the thickness of the stem cell colony can be acquired as the feature quantity related to the maturity. The thickness of the stem cell colony may be measured by a measuring device that is separately provided, or the user may set and input the thickness of the stem cell colony using the input device 5.

As the information regarding the maturity described above, the user may set and input the passage number of cells using the input device 5.

The maturity information acquisition unit 33 acquires the information regarding the maturity of cells described above, and acquires the stage of the maturity of cells from the information.

In the present embodiment, the maturity of cells is divided into three stages. However, the maturity of cells may be divided into two stages or four stages or more without being limited to the three stages. As an interval of each stage, various intervals can be set according to the culture conditions or the like.

The cell evaluation unit 23 determines a cell image evaluation method, for each local region in the colony region, based on the information regarding the maturity acquired by the maturity information acquisition unit 22 and the specific information of the local region acquired by the local region information acquisition unit 21. In the present embodiment, an evaluation method for each local region is determined in a case where the local region is a central portion of the colony region and a case where the local region is a peripheral portion of the colony region.

Specifically, the cell evaluation unit 23 of the present embodiment has a table in which a culture period and the position of a local region (a central portion and a peripheral portion of the colony region) are associated with each other as shown in FIG. 4, and determines a cell image evaluation method for each local region with reference to the table. In addition, the cell evaluation unit 23 of the present embodiment acquires the culture conditions as well as the culture period, and determines a cell image evaluation method for each local region based on the acquired culture conditions and culture period with reference to the table shown in FIG. 4.

As the culture conditions, there are conditions regarding the type of the scaffolding or the medium, conditions regarding whether to use heterologous cells (feeder cells) that are different types from cells to be cultured, and the like. Even if the culture period is the same, the form change of the colony region differs depending on the culture conditions. Therefore, in the present embodiment, the culture conditions are also taken into consideration to determine the cell image evaluation method for each local region.

The culture conditions are not limited to the conditions described above, and may be any conditions as long as the conditions influence the growth rate of cells. For example, the environmental conditions of culture, such as temperature, humidity, or $CO_2$ concentration, may be included. The information of the culture conditions is set and input by the user using the input device 5, for example. However, for the temperature and the humidity described above, conditions measured by using a thermometer or a hygrometer may be used.

Specifically, for example, in a case where the culture conditions are conditions A and the culture period is the early stage of culture, the cell colony region is a single layer in a state in which undifferentiated cells are uniformly distributed. Accordingly, the cell evaluation unit 23 can recognize individual cells by analyzing the cell image. Therefore, for the entire cell colony region, an evaluation method based on the state of individual cells (cell units) is determined.

As a cell image evaluation method based on the state of individual cells, for example, it is preferable to acquire the distribution state of individual cells and evaluate a cell image based on the uniformity of the distribution state. For example, in a case where the cells to be evaluated are stem cells, the stem cells may be evaluated to be in an undifferentiated state in a case where the stem cells are uniformly distributed, and it may be evaluated that the differentiation of some stem cells has occurred in a case where the stem cells are non-uniformly distributed due to concentrating on a part.

The feature quantity acquisition section 28 acquires a feature quantity as an evaluation standard, such as the distribution state of individual cells described above. For example, the distribution state of individual cells may be acquired by detecting the pattern of the nucleoli of cells, or may be acquired by detecting the pattern of a halo caused by diffracted light passing through the cells. When illumination light passes through the cells, diffraction occurs. Then, in a case where the distance between cells (slit gap) is an integral multiple of the wavelength of illumination light, the phase of diffracted light (±1-order diffracted light) and the phase of direct light (zero-order diffracted light) match each other, and high-brightness artifacts occur. The high-brightness artifacts are a halo.

Without being limited to the uniformity of the distribution of individual cells, the density of individual cells may be acquired by the feature quantity acquisition section 28, and the cell image may be evaluated based on the density. For example, in a case where the cells to be evaluated are stem cells, it may be evaluated that the undifferentiated state is satisfactorily maintained in a case where the density is equal to or greater than a predetermined threshold value, and it may be evaluated that the differentiation has progressed and the undifferentiated state is not maintained in a case where the density is less than the threshold value.

In addition, as a cell image evaluation method based on the state of individual cells, other known evaluation methods can be used without being limited to the evaluation method described above.

Then, in a case where the culture period proceeds to become the middle stage of culture, undifferentiated cells are densely distributed to be laminated in the central portion of the cell colony region. Accordingly, it is difficult to recognize individual cells from the cell image. On the other hand, the peripheral portion of the cell colony region is in a state where the single layer is maintained.

Therefore, the cell evaluation unit 23 determines an evaluation method based on the brightness distribution of the cell image for the central portion of the cell colony region, and determines an evaluation method based on the state of individual cells, similarly to the early stage of culture, for the peripheral portion of the cell colony region.

As an evaluation method based on the brightness distribution of the cell image, for example, the brightness distribution of the cell image of the central portion of the cell colony region may be acquired by the feature quantity acquisition section 28, and the cell image may be evaluated based on the uniformity of the brightness distribution. For example, in a case where the cells to be evaluated are stem cells, it may be evaluated that the undifferentiated state is maintained in a case where the brightness distribution of the cell image of the central portion is uniform, and it may be evaluated that some stem cells differentiate and the undifferentiated state is not maintained in a case where the brightness distribution is not uniform.

In addition, as an evaluation method based on the state of individual cells for the peripheral portion of the cell colony region, for example, the same evaluation method as for the early stage of culture may be used.

In the above explanation, in the case of the middle stage of culture, both the central portion of the cell colony region and the peripheral portion of the cell colony region are evaluated. However, only one local region may be evaluated and, for example, the degree of differentiation of the entire stem cell colony region may be evaluated based on the evaluation result.

In addition, the state of the entire cell colony region may be evaluated using both the evaluation result of the central portion of the cell colony region and the evaluation result of the peripheral portion of the cell colony region as described above. For example, the evaluation value of the central portion and the evaluation value of the peripheral portion may be calculated and, for example, the degree of differentiation of the entire stem cell colony region may be evaluated based on the sum value. In this case, weighted addition of the evaluation values may be performed.

Then, in a case where the culture period further proceeds to become the late stage of culture, a hole is formed in the central portion of the cell colony region, while differentiated cells are distributed in the peripheral portion of the cell colony region.

Therefore, the cell evaluation unit 23 determines an evaluation method based on the brightness distribution of the cell image for the central portion of the cell colony region, but determines a different evaluation method from the evaluation method based on the brightness distribution in the middle stage of culture. Specifically, in the late stage of culture, a hole may be formed as described above. Accordingly, for example, it is evaluated whether or not there is a closed region with a brightness higher than a predetermined threshold value and an area equal to or greater than a predetermined threshold value. In a case where such an area is present, it may be evaluated that a hole is formed.

In the peripheral portion of the cell colony region, as the culture progresses, cells starts to differentiate and migrate. For this reason, many halos described above are generated. Therefore, for the peripheral portion of the cell colony region, an evaluation method based on the area of the halo is determined. Specifically, it is preferable to calculate the area of the halo and evaluate the degree of differentiation of the peripheral portion or the like based on the area. For example, it may be evaluated that the degree of differentiation progresses as the area of the halo increases.

Instead of the evaluation method based on the area of the halo described above, for example, as in the case where the culture conditions are conditions B in FIG. 4, an evaluation method based on the contrast of the edge present in the peripheral portion of the cell colony region may be determined. Specifically, the feature quantity acquisition section 28 may detect the edge present in the peripheral portion of the cell colony region using a filter or the like, calculate the contrast of the edge, and evaluate the degree of differentiation of the peripheral portion or the like based on the contrast. For example, it may be evaluated that the degree of differentiation progresses as the contrast of the edge decreases.

Also for the late stage of culture, similarly to the case of the middle stage of culture, only one local region of the central portion and the peripheral portion may be evaluated, and the degree of differentiation of the entire cell colony region may be evaluated based on the evaluation result. In addition, similarly to the case of the middle stage of culture, the state of the entire cell colony region may be evaluated using both the evaluation result of the central portion of the cell colony region and the evaluation result of the peripheral portion of the cell colony region.

As a method of evaluating the central portion and the peripheral portion of the cell colony region in each culture stage, other known evaluation methods can be used without being limited to the method described above.

In the present embodiment, as described above, a cell image evaluation method is determined based on the information regarding the maturity of cells and the position of the local region in the cell colony region. However, depending on the type of cell, the way of its growth or the form change is different. Accordingly, the cell image evaluation method may also be determined by further taking the type of cell into consideration.

Specifically, for example, the table shown in FIG. 4 may be set for each type of cell, and the cell evaluation unit 23 may also acquire the information of the cell type to determine the cell image evaluation method. The evaluation method for each local region in each culture stage may be appropriately set according to the characteristics of the form change of cells. As the information of the cell type, there are pluripotent stem cells such as the iPS cells, the ES cells, or the STAP cells described above, cells of nerves, myocardium, skin, or liver that are differentiation-induced from stem cells, and cancer cells.

For example, in the case of generating a myocardial sheet, a method is used in which various cells that form a myocardium, such as myocardial cells, vascular endothelial cells, and stromal cells, are separately cultured and differentiated and then are put into the same culture vessel for co-culture so as to be self-organized. In this case, vascular endothelial cells and stromal cells are placed at a position where it is desirable to form blood vessels or myocardial cells are placed at a position where it is desirable to form a myocardium, so that the various cells are placed at positions designed in advance.

In this case, since it is possible to see in advance at which location in the myocardium colony which cells are placed, an evaluation method may be determined for each local region in the myocardium colony based on the cell placement information. For example, for a local region where myocardial cells are placed, a pulsation period may be evaluated. For a local region where blood vessels are formed, whether or not undifferentiated cells remain may be evaluated, or whether or not a hole is formed may be evaluated, or a cell form such as the presence or absence of the clogging of blood vessels may be evaluated.

In this case, the information of the type of cell or information regarding at which position in the cell colony cells are placed may be set and input by the user using the input device 5, for example.

In addition, the placement of various cells is not designed in advance, but complete self-organization may be performed. In this case, for example, the placement of blood vessels or myocardium may be roughly specified based on the low magnification image of the myocardial colony, and an evaluation method according to the blood vessels or the myocardium described above may be determined for the specified local region. That is, the local region information acquisition unit 21 may specify a local region to be evaluated and the type of cell included in the local region based on the low magnification image of the myocardial colony, and determine an evaluation method according to the specified cell type for the specified local region. As a method of specifying blood vessels, for example, it is preferable to extract a linear pattern. In addition, as a method of specifying myocardial cells, it is preferable to extract myocardial cells from the shape or movement of cells.

In the above explanation, the case of generating a myocardial sheet has been described. However, without being limited to the myocardium, even when culturing other tissues, an evaluation method according to the type of cell for each local region can be similarly determined.

Referring back to FIG. 1, the imaging control section 25 outputs a control signal to the control unit 12 of the cell culture device 1, thereby controlling the movement of the stage 10 in the X-Y direction. In a case where the phase contrast microscope 30 is configured to be able to automatically change the magnification of the phase difference lens 34, the imaging control section 25 outputs a control signal to the control unit 39 of the imaging device 3 so that the phase difference lens 34 of low magnification and the phase difference lens 34 of high magnification are changed. In a case where the phase contrast microscope 30 is configured to manually change the magnification of the phase difference lens 34, the user may perform a change to the phase difference lens 34 of high magnification at the time of high magnification imaging.

The display control section 26 displays the cell image captured by the phase contrast microscope 30 on the display 4. In addition, the display control section 26 displays the evaluation result of the cell colony region by the cell evaluation unit 23 on the display 4. When the display control section 26 displays the evaluation result on the display 4, an evaluation result for each local region of the cell colony region described above may be displayed. In the case of evaluating the entire cell colony region based on the evaluation result for each local region, the evaluation result of the entire cell colony region may be displayed. Specifically, in the case of the present embodiment, the evaluation result of the central portion of the cell colony region and the evaluation result of the peripheral portion of the cell colony region may be displayed. In the case of evaluating the entire cell colony region based on the evaluation result of the central portion and the evaluation result of the periphery, the evaluation result of the entire cell colony region may be displayed.

Figure 5:
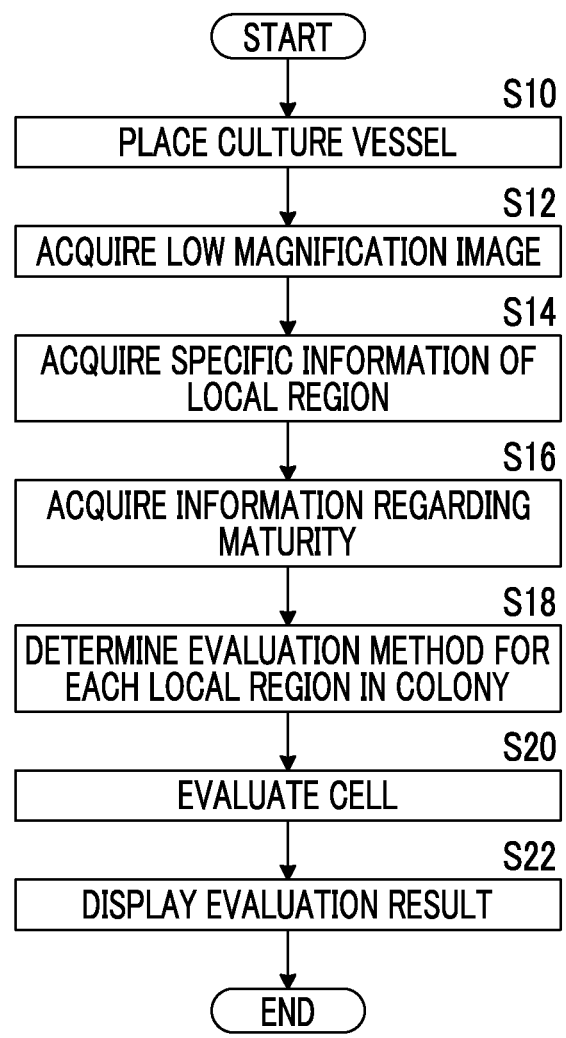
FIG. 5 is a flowchart illustrating the operation of the stem cell culture observation system using an embodiment of the cell image evaluation device of the present invention.

Next, the operation of the above-described cell culture observation system will be described with reference to the flowchart shown in FIG. 5.

First, in the cell culture device 1, the transport unit 11 selects a culture vessel to be imaged from a plurality of culture vessels housed therein, and places the selected culture vessel 15 on the stage 10 (S10).

Then, the magnification of the phase difference lens 34 of the phase contrast microscope 30 is set to low magnification and a low magnification image is captured, and the captured low magnification image is acquired by the low magnification image acquisition unit 20 (S12). The low magnification image acquired by the low magnification image acquisition unit 20 is output to the display control section 26, and is displayed on the display 4 by the display control section 26.

The low magnification image acquired by the low magnification image acquisition unit 20 is output to the local region information acquisition unit 21, and the local region information acquisition unit 21 specifies the position of a cell colony region in the low magnification image based on the input low magnification image and acquires information specifying a local region in the cell colony region (S14).

On the other hand, the maturity information acquisition unit 22 acquires information of culture conditions and information of the culture period as the information regarding the maturity of cells through a setting input or the like from the user (S16).

Then, the information of the culture period and the culture conditions acquired by the maturity information acquisition unit 22 is output to the cell evaluation unit 23, and the cell evaluation unit 23 determines a cell image evaluation method for each local region of the cell colony region based on the information of the culture period and the culture conditions and the information specifying the local region. That is, in the present embodiment, a method of evaluating the cell image of the central portion of the cell colony region and a method of evaluating the cell image of the peripheral portion are determined (S18). Then, the cell evaluation unit 23 evaluates a cell image in the cell colony region based on the determined evaluation method, and outputs the evaluation result to the display control section 26 (S20).

The display control section 26 displays the input evaluation result of the cell colony region on the display 4 (S22).

According to the cell culture observation system of the embodiment described above, a local region in the colony region of cells in a cell image is specified, an evaluation method for a cell image in the local region is determined for each local region in the colony region, and the cell image of the local region is evaluated using the determined evaluation method. Therefore, it is possible to appropriately evaluate the stem cell colony according to different form changes in the respective local regions of the cell colony.

Figure 6:
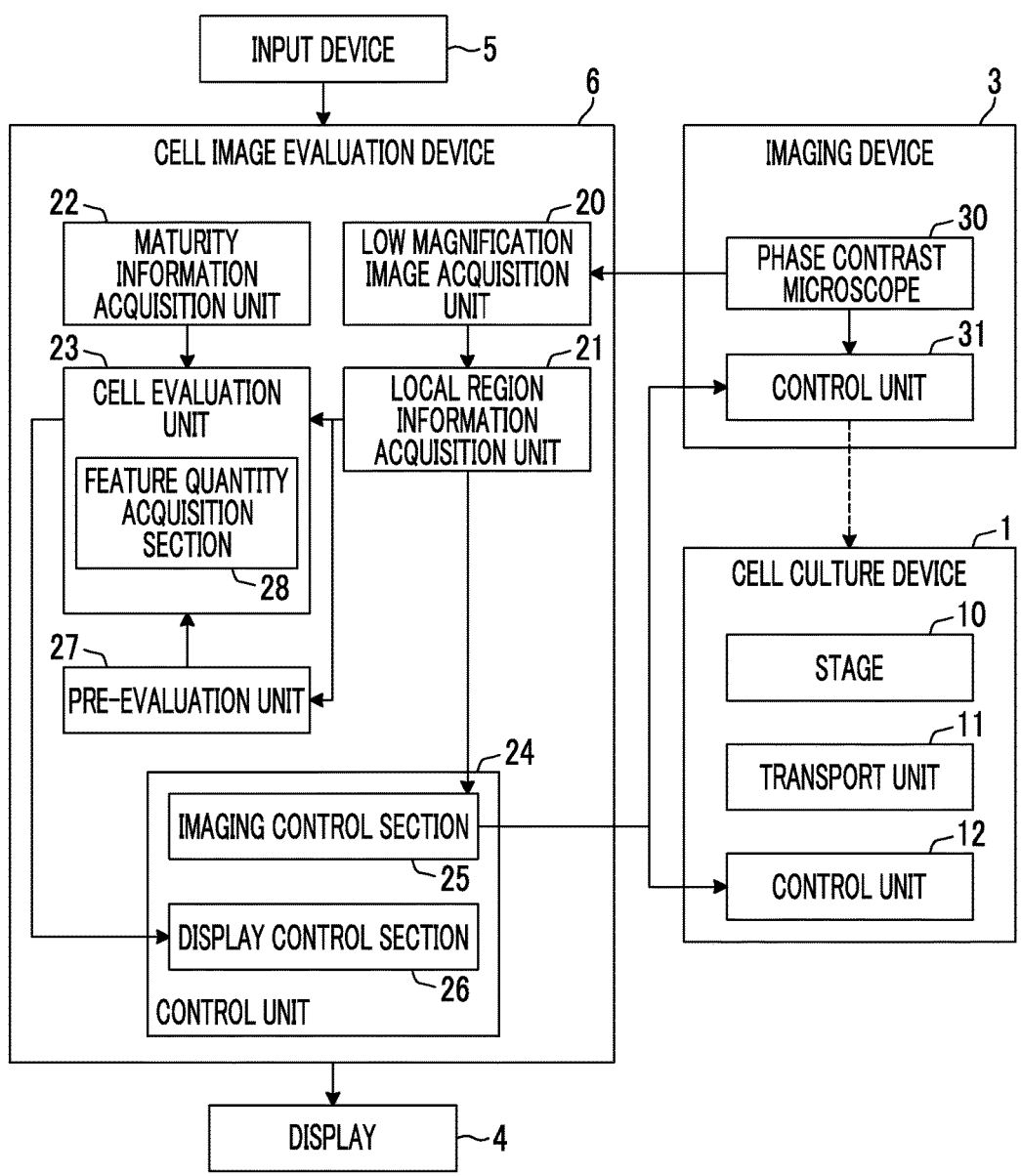
FIG. 6 is a block diagram showing a modification example of the stem cell culture observation system using an embodiment of the cell image evaluation device of the present invention.

In addition, in the cell culture observation system of the embodiment described above, an evaluation method for each local region is set in advance as a table. However, the evaluation method for each local region is not limited thereto. As shown in FIG. 6, a pre-evaluation unit 27 that performs pre-evaluation of a cell image of a local region before the evaluation of the cell image may be further provided, and the cell evaluation unit 23 may determine an evaluation method for the cell image in each local region based on the pre-evaluation result of the pre-evaluation unit 27.

Specifically, for example, the pre-evaluation unit 27 may pre-evaluate whether or not individual cells can be identified for the cell image of the local region. An evaluation method based on individual cells may be determined as described above in a case where it is possible to identify individual cells, and an evaluation method based on the brightness distribution may be determined as described above in a case where it is not possible to identify individual cells. For whether or not it is possible to identify individual cells, for example, it is preferable to evaluate the contrast of the edge of individual cells.

In addition, in the cell culture observation system of the embodiment described above, a high magnification image may be acquired by imaging the cells of a local region at high magnification, and the display control section 26 may display the high magnification image on the display 4.

EXPLANATION OF REFERENCES

1: cell culture device
2: cell image evaluation device
3: imaging device
4: display
5: input device
10: stage
11: transport unit
12: control unit
20: low magnification image acquisition unit
21: local region information acquisition unit
22: maturity information acquisition unit
23: cell evaluation unit
24: control unit
25: imaging control section
26: display control section
27: pre-evaluation unit
28: feature quantity acquisition section
30: phase contrast microscope
31: white light source
32: slit plate
33: objective lens
34: phase difference lens
35: objective lens
36: phase plate
37: imaging lens
38: imaging element

What is claimed is:

1. A cell image evaluation device, comprising:
a processor configured to:
acquire a cell image by imaging cells;
evaluate the cell image;
acquire information regarding maturity of the cells; and
acquire specific information of a local region in a colony region of the cells in the cell image, the colony region having a plurality of local regions,
wherein the evaluation of the cell image is conducted by determining, for each local region of the plurality of local regions in the colony region, an evaluation method with respect to a cell image of the local region based on:
the specific information of the local region, wherein the specific information of each of the plurality of local regions is information on whether a position of the local region within the cell colony is a center portion of the colony region or a peripheral portion of the colony region, and wherein each of the plurality of the local regions in the central portion have a different evaluation method than each of the plurality of local regions in the peripheral portion,
the information regarding the maturity of the cells, and culture conditions of the cells; and evaluating the cell image of the local region using the determined evaluation method, thereby evaluating a differentiation state of a cell in the local region.

2. The cell image evaluation device according to claim 1, wherein the evaluation method for the cell image of the local region is an evaluation method based on a brightness distribution of the cell image of the local region in a case where the local region is a central portion of the colony region.

3. The cell image evaluation device according to claim 2, wherein the evaluation method for the cell image of the local region is an evaluation method using a state of individual cells included in the cell image of the local region in a case where the local region is a peripheral portion of the colony region.

4. The cell image evaluation device according to claim 2, wherein the evaluation method for the cell image of the local region is an evaluation method based on an image of a halo included in the cell image of the local region in a case where the local region is a peripheral portion of the colony region.

5. The cell image evaluation device according to claim 2, wherein the evaluation method for the cell image of the local region is an evaluation method based on contrast of an edge of the colony region included in the cell image of the local region in a case where the local region is a peripheral portion of the colony region.

6. The cell image evaluation device according to claim 2, wherein the information regarding the maturity is information of a culture period of the cells.

7. The cell image evaluation device according to claim 1, wherein the evaluation method for the cell image of the local region is an evaluation method using a state of individual cells included in the cell image of the local region in a case where the local region is a peripheral portion of the colony region.

8. The cell image evaluation device according to claim 1, wherein the evaluation method for the cell image of the local region is an evaluation method based on an image of a halo included in the cell image of the local region in a case where the local region is a peripheral portion of the colony region.

9. The cell image evaluation device according to claim 1, wherein the evaluation method for the cell image of the local region is an evaluation method based on contrast of an edge of the colony region included in the cell image of the local region in a case where the local region is a peripheral portion of the colony region.

10. The cell image evaluation device according to claim 1, wherein the information regarding the maturity is information of a culture period of the cells.

11. The cell image evaluation device according to claim 1, wherein the information regarding the maturity is acquired by analyzing image information of the colony region.

12. The cell image evaluation device according to claim 11, wherein the information regarding the maturity is information regarding a shape or a size of the colony region.

13. The cell image evaluation device according to claim 1, wherein the processor is further configured to:
perform pre-evaluation of the cell image before evaluating the cell image of the local region,
wherein the evaluation method for the cell image of the local region is determined based on a result of the pre-evaluation.

14. The cell image evaluation device according to claim 1, wherein the specific information of the local region is acquired based on a cell image of the colony region.

15. The cell image evaluation device according to claim 1, wherein the evaluation method for each local region is determined based on the specific information of the local region and a type of the cells.

16. The cell image evaluation device according to claim 15, wherein the type of the cells is specified based on a cell image of the colony region.

17. A cell image evaluation method, comprising:
acquiring a cell image by imaging cells;
evaluating the cell image;
acquiring information regarding maturity of the cells; and
acquiring specific information of a local region in a colony region of the cells in the cell image, the colony region having a plurality of local regions,
wherein evaluating the cell image is conducted by
determining, for each local region of the plurality of local regions in the colony region, an evaluation method with respect to a cell image of the local region based on:
the specific information of the local region, wherein the specific information of each of the plurality of local regions is information on whether a position of the local region within the cell colony is a center portion of the colony region or a peripheral portion of the colony region, and wherein each of the plurality of the local regions in the central portion have a different evaluation method than each of the plurality of local regions in the peripheral portion,
the information regarding the maturity of the cells, and culture conditions of the cells; and
evaluating the cell image of the local region using the determined evaluation method, thereby evaluating a differentiation state of a cell in the local region.

18. A non-transitory computer readable recording medium storing a cell image evaluation program causing a computer to:
acquire a cell image by imaging cells;
evaluate the cell image;
acquire information regarding maturity of the cells; and
acquire specific information of a local region in a colony region of the cells in the cell image, the colony region having a plurality of local regions,
wherein the evaluation of the cell image is conducted by
determining, for each local region of the plurality of local regions in the colony region, an evaluation method with respect to a cell image of the local region based on:
the specific information of the local region, wherein the specific information of each of the plurality of local regions is information on whether a position of the local region within the cell colony is a center portion of the colony region or a peripheral portion of the colony region, and wherein each of the plurality of the local regions in the central portion have a different evaluation method than each of the plurality of local regions in the peripheral portion,
the information regarding the maturity of the cells, and culture conditions of the cells; and
evaluating the cell image of the local region using the determined evaluation method, thereby evaluating a differentiation state of a cell in the local region.

* * * * *